(12) United States Patent
Walters et al.

(10) Patent No.: US 8,458,783 B2
(45) Date of Patent: Jun. 4, 2013

(54) USING APPLICATION GATEWAYS TO PROTECT UNAUTHORIZED TRANSMISSION OF CONFIDENTIAL DATA VIA WEB APPLICATIONS

(75) Inventors: Robert V. Walters, Santa Clara, CA (US); Abhishek Chauhan, Los Gatos, CA (US); Rajiv Mirani, Los Gatos, CA (US); Prince Kohli, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 453 days.

(21) Appl. No.: 12/351,199

(22) Filed: Jan. 9, 2009

(65) Prior Publication Data
US 2009/0119768 A1 May 7, 2009

Related U.S. Application Data

(63) Continuation of application No. 10/882,997, filed on Jun. 30, 2004.

(51) Int. Cl.
*G06F 9/00* (2006.01)

(52) U.S. Cl.
USPC .................. 726/12; 726/22; 726/30; 713/152; 713/168; 713/187

(58) Field of Classification Search
None
See application file for complete search history.

(56) References Cited

U.S. PATENT DOCUMENTS

| | | |
|---|---|---|
| 5,204,897 A | 4/1993 | Wyman |
| 5,321,841 A | 6/1994 | East et al. |
| 5,515,508 A | 5/1996 | Pettus et al. |
| 5,519,867 A | 5/1996 | Moeller et al. |
| 5,848,410 A | 12/1998 | Walls et al. |
| 6,412,000 B1 | 6/2002 | Riddle et al. |
| 6,449,658 B1 | 9/2002 | Lafe et al. |
| 6,519,643 B1 | 2/2003 | Foulkes et al. |
| 6,658,464 B2 | 12/2003 | Reisman |
| 6,786,397 B2 | 9/2004 | Silverbrook et al. |
| 6,792,605 B1 * | 9/2004 | Roberts et al. ............... 719/313 |
| 6,850,943 B2 | 2/2005 | Teixeira et al. |
| 6,873,988 B2 | 3/2005 | Herrmann et al. |
| 6,920,502 B2 | 7/2005 | Araujo et al. |
| 6,938,826 B2 | 9/2005 | Silverbrook et al. |
| 6,947,027 B2 | 9/2005 | Lapstun et al. |

(Continued)

OTHER PUBLICATIONS

Farrow, R., "CSI 1997 Firewalss Matrix [An Analaysis of Current Firewall Technologies]", Rik Farrow's 1997 Firewall Product Analysis; www.gocsi.com/farrowpa.htm; Dec. 23, 2003, 5 pages.

(Continued)

*Primary Examiner* — Shewaye Gelagay
(74) *Attorney, Agent, or Firm* — Foley and Lardner LLP; Christopher J. McKenna

(57) ABSTRACT

A security gateway receives messages transmitted between a server and a client device on a network and parses the messages into a plurality of data objects, such as strings and name-value pairs. The data objects may represent user personal identification information, such as user name, social security number, credit card number, patient code, driver's license number, and other personal identification information. The security gateway uses rules to recognize data objects and validate the data objects to determine whether the recognized data objects are appropriately included within the context. The security gateway may also perform an action on the data objects. Data objects that are not appropriately included in the context may be transformed, suppressed or disallowed.

25 Claims, 5 Drawing Sheets

U.S. PATENT DOCUMENTS

| | | | |
|---|---|---|---|
| 7,048,178 | B2 | 5/2006 | Silverbrook et al. |
| 7,054,944 | B2 | 5/2006 | Tang et al. |
| 7,113,934 | B2 | 9/2006 | Levesque et al. |
| 7,116,781 | B2 | 10/2006 | Rhoads |
| 7,123,245 | B2 | 10/2006 | Lapstun et al. |
| 7,180,507 | B2 | 2/2007 | Lapstun et al. |
| 7,185,075 | B1 | 2/2007 | Mishra et al. |
| 7,213,756 | B2 | 5/2007 | Silverbrook et al. |
| 7,584,252 | B2 * | 9/2009 | Okada et al. ............ 709/206 |
| 2001/0032207 | A1 | 10/2001 | Hartley et al. |
| 2001/0047406 | A1 | 11/2001 | Araujo et al. |
| 2002/0032725 | A1 | 3/2002 | Araujo et al. |
| 2002/0128857 | A1 | 9/2002 | Lee |
| 2002/0161801 | A1 | 10/2002 | Hind et al. |
| 2002/0169887 | A1 | 11/2002 | MeLampy et al. |
| 2003/0055962 | A1 | 3/2003 | Freund et al. |
| 2003/0088771 | A1 | 5/2003 | Merchen |
| 2003/0120949 | A1 * | 6/2003 | Redlich et al. ............ 713/200 |
| 2003/0177389 | A1 | 9/2003 | Albert et al. |
| 2003/0191812 | A1 | 10/2003 | Agarwalla et al. |
| 2003/0204719 | A1 * | 10/2003 | Ben-Itzhak ............ 713/152 |
| 2004/0002903 | A1 * | 1/2004 | Stolfo et al. ............ 705/26 |
| 2004/0044731 | A1 | 3/2004 | Chen et al. |
| 2004/0107360 | A1 | 6/2004 | Herrmann et al. |
| 2005/0015624 | A1 | 1/2005 | Ginter et al. |
| 2005/0044089 | A1 | 2/2005 | Wu et al. |
| 2005/0050053 | A1 | 3/2005 | Thompson |
| 2005/0080850 | A1 | 4/2005 | Salesky et al. |
| 2005/0223412 | A1 * | 10/2005 | Nadalin et al. ............ 726/3 |
| 2005/0262357 | A1 | 11/2005 | Araujo et al. |

OTHER PUBLICATIONS

Reumann, John, et al. "Adaptive Packet Filters;" Department of Electircal Engineering and Computer Science; The University of Michigan, Ann Arbor, MI 48109-2122; 5 pages.

Ranum, Marcus J., Thinking About Firewalls; Trusted Information Systems, Inc., Glenwood Maryland, 10 pages.

Office Action for U.S. Appl. No. 10/882,997 dated Oct. 18, 2007.

Office Action for U.S. Appl. No. 10/882,997 dated Oct. 9, 2008.

* cited by examiner

US 8,458,783 B2

USING APPLICATION GATEWAYS TO PROTECT UNAUTHORIZED TRANSMISSION OF CONFIDENTIAL DATA VIA WEB APPLICATIONS

This application claims priority to U.S. patent application Ser. No. 10/882,997, filed on Jun. 30, 2004, entitled "Using Application Gateways to Protect Unauthorized Transmission of Confidential Data Via Web Applications", which is incorporated herein in its entirety by reference.

FIELD OF THE INVENTION

The present invention relates generally to web application security systems, and more particularly, to using security gateways to protect unauthorized transmission of confidential user personal identification information via web applications.

BACKGROUND

Corporations are rapidly deploying web-based applications to automate business processes and to facilitate real-time interaction with customers, business partners and employees. Highly vulnerable to malicious hackers, web applications provide an entry point through which sensitive data can be accessed and stolen. Given the vulnerability of web applications, establishing protection of sensitive data is critical for any enterprise that is exposing sensitive information over the Internet.

Existing solutions for protecting unauthorized transmission of confidential personal identification information via web applications are known. According to one known method, web developers manually review computer code to persons. One downside of this approach is that web developers need to review computer code each time web application changes.

According to another approach, known as a web site defacement, unique digital signatures are assigned to CGI scripts and Active Server Pages published on a web site. When a reply is sent from a web server in response to a request from a client device, a digital signature of the content of the reply is compared with the previously saved signature of the stored content for the web page. If the signatures match, the content is deemed authentic and sent to the user without delay. If the signatures don't match, the content is deemed tampered with and the requested transaction is not executed. One downside of this approach is its lack of flexibility. For example, when a web page is dynamically updated, it is assumed that the web application has been tampered with because a digital signature of the dynamically updated web page does not match the digital signature of the original web page. As a result, the web site defacement approach similarly does not reflect the dynamic nature of web applications.

Accordingly, what is needed is a web application security technique that protects unauthorized transmission of confidential personal identification information via web applications while reflecting dynamic nature of web applications.

BRIEF SUMMARY

A security gateway receives messages transmitted between a server and a client device on a network and parses the messages into a plurality of data objects, such as strings and name-value pairs. The data objects represent user personal identification information, such as user name, social security number, credit card number, patient code, driver's license number, and other personal identification information. The security gateway recognizes data objects and validates the recognized data objects by determining whether the recognized data objects are appropriately included within the context. The security gateway also performs an action on the recognized data objects. Data objects that are not appropriately included in the context are, for example, transformed, suppressed or disallowed. The security gateway thus reduces the risk of Internet-based identity theft and financial fraud by protecting unauthorized transmission of personal identification information via web applications.

In one embodiment, initially messages are received by a message parser. Examples of the received messages are Hypertext Markup Language (HTML) messages, Extensible Markup Language (XML) messages, Simple Mail Transfer Protocol (SMTP) messages, and other client-server communication. A message parser parses the messages into data objects, such as name-value pairs and strings of characters, and outputs an object model which represents a hierarchy of objects.

A rule engine receives the object model created by a message parser and uses rules to recognize data objects, validate data objects, and perform one or more actions on the data objects. In one implementation, a rule has three components: a recognizing component, a validation component, and an action component. In one implementation, the rule engine recognizes, validates and performs an action on data objects at the same time. An exemplary rule used by the rule engine: IF (credit card (16 digits) AND number of occurrences in the message (3)) THEN transform first 12 digits of credit card numbers.

In one implementation, the rule engine recognizes data objects by determining whether the data objects match a pattern indicated in the recognizing component of the rule. The recognized data objects are, for example, name-value pairs, a name component of the name-value pair, a value component of the name-value pair, an XML tag, etc. The rule engine validates recognized data objects to determine whether the recognized data objects are appropriately included in the context. The context is, for example, a session, a message, or any other unit of client-server communication. The rule engine also performs an action on the recognized data objects. Data objects that are not appropriately included in the context are, for example, transformed, suppressed or disallowed To determine whether the recognized data objects have been appropriately included within a session, the security gateway preferably includes a sessionizer module adapted to derive a session ID from a message and store recognized data object in association with the session ID. When a new data object is recognized, the security gateway determines whether the recognized data object is already stored in association with the session ID, and stores the data object if it has not been stored during the session.

In another implementation, a recognizing component in the rule is implemented as one or more recognizing plug-in modules adapted to recognize data objects. A validation component in the rule is implemented as a corresponding validation plug-in module adapted to validate data objects recognized by a recognizing module. To process a rule, the rule engine invokes a recognizing plug-in module (or modules) indicated in the rule. The recognizing module (or modules) recognizes data objects in the message and outputs the recognized data objects to the rule engine. The rule engine invokes a corresponding validation module as indicated in the rule. The validation module determines whether the recognized data objects are appropriately included in the context and provides an indication to the rule engine of whether recognized data objects are valid. The rule engine, in turn, performs an action as indicated in the rule in response to the received indication.

These features are not the only features of the disclosure. In view of the drawings, specification, and claims, many additional features and advantages will be apparent.

The figures depict a preferred embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

1. System Architecture Overview

Figure 1:
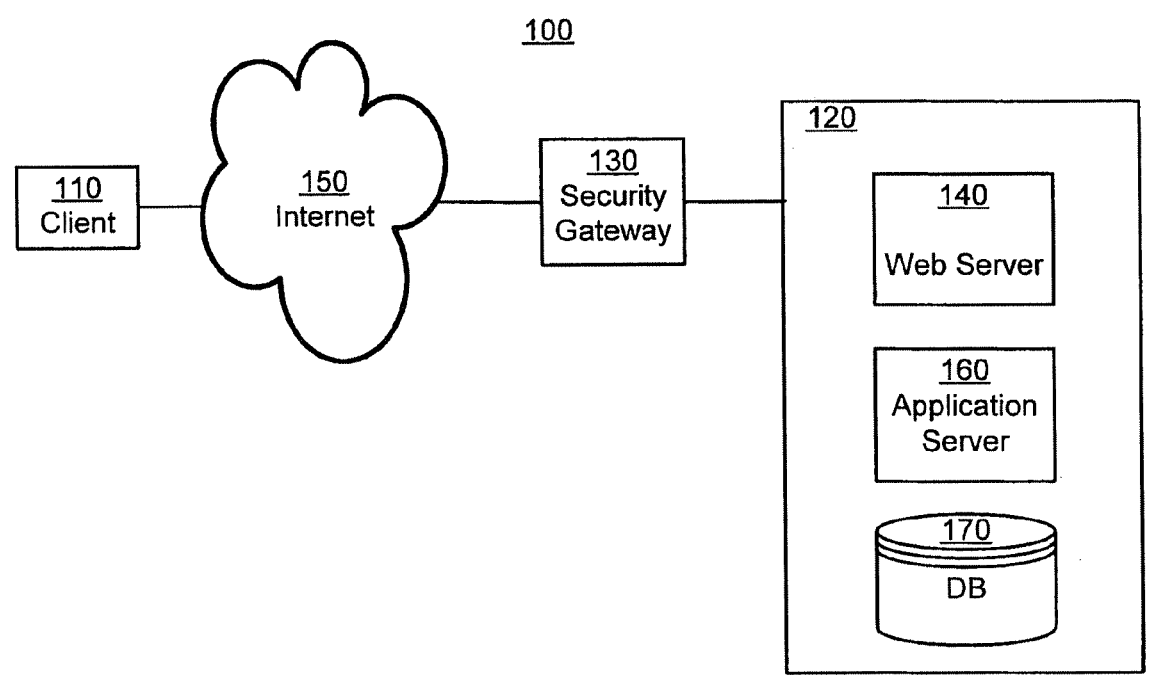
FIG. 1 is a block diagram of environment in which the disclosure operates.

FIG. 1 is a block diagram of an environment 100 in which the disclosure operates. The environment 100 includes a client system 110 and a server system 120 connected by a communication network 150. A security gateway 130 is interposed between and connected to client 110 and server 120. Although the disclosure is described in the context of the client-server architecture, it should be understood that the disclosure could be implemented in any other suitable architecture, such as a peer-to-peer architecture where each system 110 and 120 can be a client and a server.

As used herein, the term "server system" 120 simply denotes those aspects of the software program associated with a remote computer, as well as underlying operating system and hardware support. As will be understood by those of skill in the art, a server system 120 within the context of the present disclosure can comprise components of the software program, as well as components of the operating system of a remote computer and hardware components of a remote computer. Server system 120 may include a web infrastructure, such as a web server 140, an application server 160, and a database 170. Web server 140 is a computer running software for serving content across the Internet, such as for example Microsoft Corporation's Internet Information Server (IIS), or Apache from The Apache Software Foundation. Web server 140 responds to requests received from client system 110 by transmitting HTML pages across the Internet for display by a web browser (not shown) that is running on client system 110. Application server 160 is a program that handles application operations between users and enterprise's backend business applications or databases. Database 170, in turn, stores data relevant to the enterprises' operations. The server system 120 may comprise one or more computers for implementing the above described functionality and services.

As used herein, the term "client system" 110 simply denotes those aspects of the software program associated with a user's computer, as well as underlying operating system and hardware support. As will be understood by those of skill in the art, a client system 110 within the context of the present disclosure can comprise components of the software program, as well as components of the operating system of a user's computer and hardware components of a user's computer. Client system 110 includes a web browsing functionality. While FIG. 1 illustrates a single client system 110, it is appreciated that in actual practice there will be any number of client systems 110 that communicate with the server system 120.

Communication network 150 is, for example, the Internet, and particularly, the World Wide Web portion thereof. However, it will also be appreciated that communication network 150 can be any known communication network.

In one implementation, security gateway 130 operates as a proxy in that it is installed in front of server 120. In another embodiment, the security gateway 130 is an intermediary between the server 120 and the client 110. In yet another implementation, the security gateway 130 operates as a gateway between the public Internet and an internal network (not shown), such as a WAN, or LAN. This implementation ensures that all incoming and outgoing messages are inspected for compliance with defined security policies so that all of the network's assets can be protected against new, yet-undefined threats.

Security gateway 130 receives messages transmitted between a server 120 and a client 110 on network 150 and parses the messages into a plurality of data objects, such as strings and name-value pairs. The data objects represent user personal identification information, such as a user name, social security number, credit card number, patient code, driver's license number, and other identification information. The security gateway 130 uses rules to recognize the data objects, validate the recognized data objects to determine whether the recognized data objects are appropriately included within the context, and perform an action on the data objects. Data objects that are not appropriately included in the context are transformed, suppressed or disallowed. The security gateway 130 thus protects unauthorized transmission of personal identification information via web applications.

Figure 2:
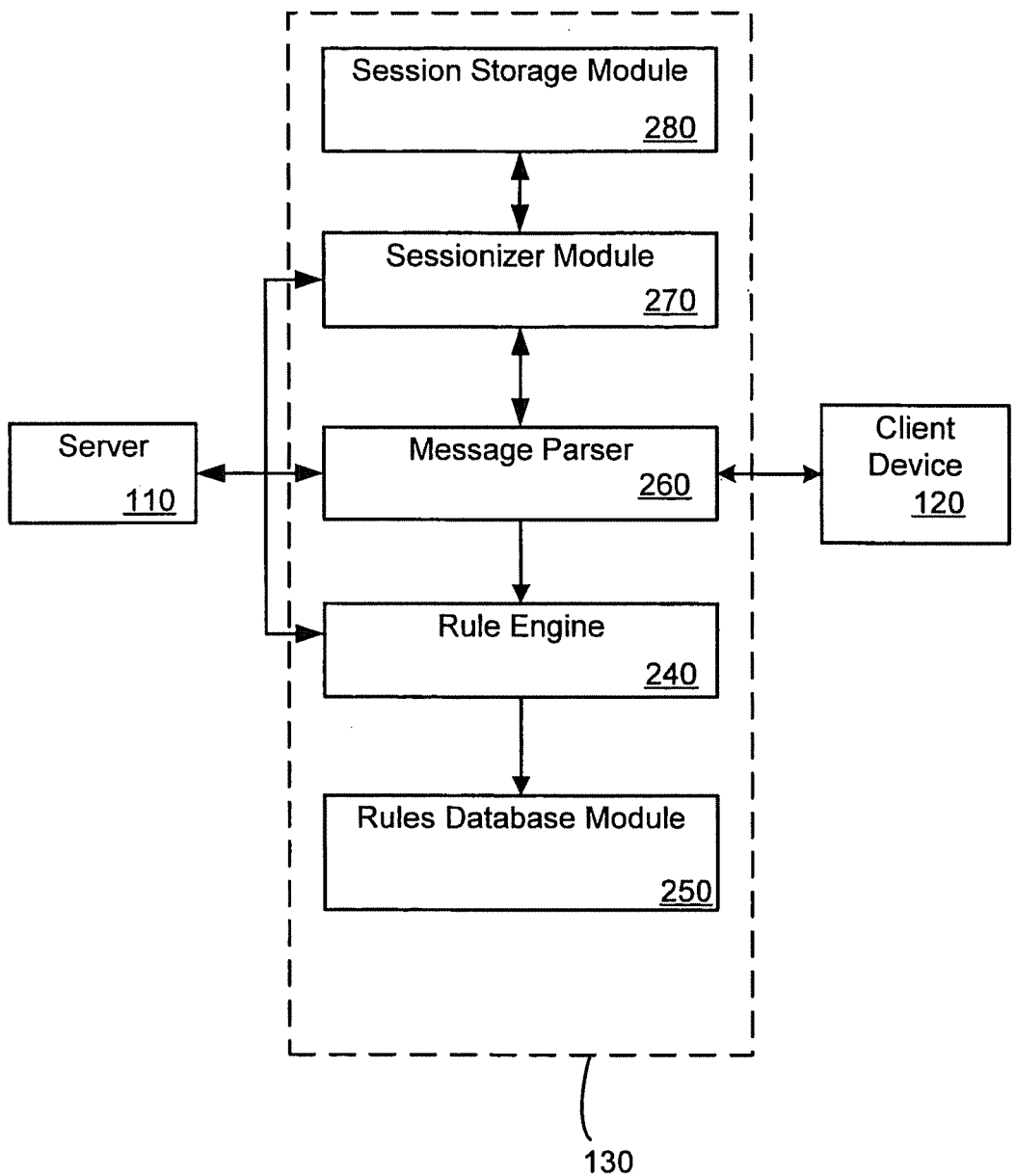
FIG. 2 is a block diagram of an embodiment of a system for protecting unauthorized transmission of confidential personal identification information via web applications.

FIG. 2 is a block diagram of functional modules of security gateway 130. These modules include a message parser 260, a rule engine 240, a rules database module 250, a sessionizer module 270, and a sessionizer storage module 280. As used herein, the term "module" refers to computer program code and/or any hardware for providing the functionality attributed to the module.

Message parser 260 is adapted to receive client and server messages and parse the messages into defined elements. Examples of the received messages are Hypertext Markup Language (HTML) messages, Extensible Markup Language (XML) messages, Simple Mail Transfer Protocol (SMTP) messages, and other client-server communication. Message parser 260 parses the messages into data objects, such as name-value pairs and data strings and creates an object model.

Rules database module 250 stores rules for recognizing, validating and performing an action on data objects. A rule has a predicate and a consequent. The predicate preferably has two components: a recognizing component and a validation component. The consequent is an action component of the rule. A recognizing component of the rule can have more than one validation component associated with it. A rule in the rules database module 250 is associated with a type of the message (HTML, XML, SMTP, or any other message type), and is applied to all messages of the associated type. A rule in the rules database module 250 is also indexed by a client or server message.

In one embodiment, rule engine 240 receives the object model created by message parser 260. In another implementation, rule engine 240 receives messages directly from server 120 or client device 110. Rule engine 240 determines a type of the message within which data objects appear and whether the message is a client or a server message. Rule engine 240 queries rules database module 250 to apply a rule associated with the message type. Rule engine 240 processes the rules to recognize, validate and perform an action on the recognized data objects. The rule engine 240 recognizes data objects by determining whether the data objects match a pattern indicated by the recognizing component of the rule. The recognized data objects are, for example, name-value pairs, a name component of the name-value pair, a value component of the name-value pair, an XML tag, etc. The rule engine 240 validates recognized data objects by determining whether the recognized data objects are appropriately included in the context. The context is, for example, a session, a message, or any other unit of client-server communication. The rule engine 240 also performs an action on the recognized data objects. Data objects that are not appropriately included in the context are, for example, transformed, suppressed or disallowed.

(step 320) server and client messages and parses the received messages into strings of characters and name-value pairs. Examples of the received messages are HTML, XML, SMTP messages, and any other client-server communication. The name-value pairs and strings of characters are also referred to herein as "data objects." For example, in the XML format, a name-value pair is: <Patient_Code>John123</Patient_Code>. Parsed data objects are, for example, user name, social security number, credit card number, patient code, driver's license number, patient code, and other personal identification information. Message parser 260 creates an object model and outputs the object model to rule engine 240.

In one embodiment, rule engine 240 receives the object model. In another implementation, rule engine 240 receives messages directly from client device 110 and server device 120. Rule engine 240 determines (step 325) a type of the message (HTML, XML, SMTP, or any other message type) within which data objects appear and whether the message is a client or a server message. Rule engine 240 queries rules database module 250 to apply a rule (or rules) associated with the message type. Exemplary rules are shown below in Table 1:

TABLE 1

Rules for Recognizing and Validating Data Objects

| Rule ID | Message Type | Client/Server Message | Recognizing Component | Validation Component | Consequent |
| --- | --- | --- | --- | --- | --- |
| 1. | HTML | Server Message | Length of string = 16 characters and data type = numeric | No more than 2 occurrences of different credit card numbers in the message is allowed No more than 3 occurrences of different credit card numbers per session is allowed | Transform to *+4/ Log the message/ Allow Message/ Transform to *+4/ Log the message/Allow message |
| 2. | HTML | Server Message | Recognize patient code Recognize Name Recognize Age Recognize SSN | Patient code, Name, Age, and SSN cannot be displayed on one web page | Replace patient code with "suppress" |
| 3. | HTML | Client Message | Recognize Password | Password Value cannot match commonly-used passwords | Disallow message/allow message |

Security gateway 130 further comprises sessionizer module 270 adapted to derive a session ID from a message and store session-specific information in association with the session ID in a session storage module 280. If a rule requires the determination of whether recognized data objects are appropriately included in the session, sessionizer module 270 stores, in association with the session ID, recognized data objects that need to be validated by the rule. When a new data object is recognized, rule engine 240 determines whether the recognized data object is already stored in association with the session ID. The rule engine 240 stores in session storage module 280 the recognized data objects that have not been stored during the session.

2. Methods of Operation

Figure 3:
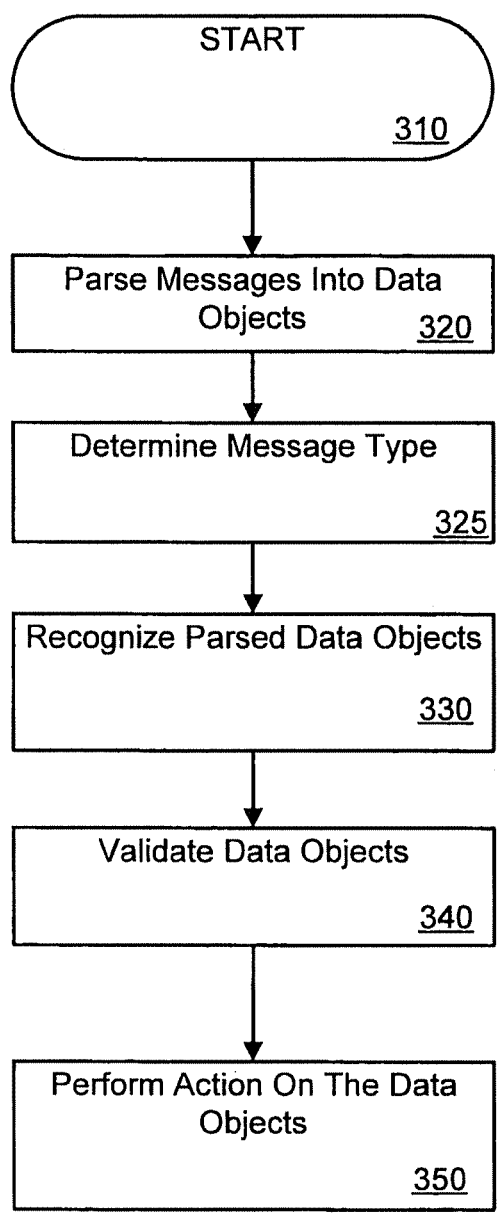
FIG. 3 is a flow chart of a method for protecting unauthorized transmission of confidential personal identification information via web applications.

Referring now, to FIG. 3, there is shown a flowchart of a method for protecting unauthorized transmission of confidential web application data according to one embodiment of the present disclosure. Initially, message parser 260 receives Rule 1

Vulnerability of web applications can result in the transmission of credit card numbers in response to the hacker's malicious attack. Security gateway 130 prevents an unauthorized transmission of credit card information through web applications by detecting each instance of a credit card number in a server response message. Accordingly, once rule engine 240 received a message, it determines the message type and whether the message is a client message or a server message. Rule engine 240 applies a rule, such as rule 1, to recognize data objects, validate and perform an action on recognized data objects. To process rule 1, rule engine 240 preferably recognizes data objects having a length of 16 characters and a numeric data type. Once rule engine 240 recognized the matching data object (credit card number), rule engine 240 preferably determines whether more than two occurrences of different credit card numbers appear in the response message, such as a web page. One skilled in the art would understand that the number used in the rule is configurable.

Rule 1 has the following rational. When a user submits a purchase order to a web application, he or she usually provides one or two different credit card numbers. Accordingly, when a server 120 sends a web page including the finalized purchase order to client 110, the web page should not include more than two different credit card numbers provided by the user. If the web page includes more than two different credit card numbers, it is more likely than not that the web page is provided in response to a malicious attack rather than to a legitimate request.

In one implementation, to determine a number of different credit card occurrences within a message, rule engine 240 maintains a list of all different recognized credit card numbers in association with the message within which the credit card numbers appears, as shown in Table 2.

TABLE 2

Example List of Credit Card Numbers
Stored in Association with Message ID

| Message ID | Credit Card Number |
|---|---|
| 111 | 1234 5678 0001 3333 |
|  | 1234 4321 2221 0001 |
|  | 5678 0001 3333 2221 |

When a new credit card number has been recognized by rule engine 240, rule engine 240 determines whether the recognized credit card number is already stored in association with the message ID, and adds the new credit card number to the list shown in Table 2 if it is not already stored. Rule engine 240 preferably maintains a running counter to determine a number of occurrences of different credit card numbers in the response message. When more than two occurrences of different credit card numbers appear within the message, it is more likely that the message is sent in response to a malicious attack rather than to a legitimate request. Accordingly, rule engine 240 modifies the message by masking the majority of digits in the credit card number as to make then worthless to hackers. Rule engine 240 transmits the modified message to client 110.

As previously described, a recognizing component of a rule can be associated with more than one validation component. Accordingly, rule 1 may also require determining whether more than three different credit card numbers appear within a session. A user session is a unit of activity that a user spends on a web site during a specified period of time. The number of user sessions on a web site is used in measuring the amount of traffic on a particular web site. A web site administrator determines the time frame of a user session (e.g., 30 minutes). If a user returns to the web site within that time period, it is still considered a one user session. If a user returns to the web site after the allotted time period has expired, for example, an hour from the initial visit, then it is considered as a different user session.

In one implementation, to determine whether the recognized data objects have been appropriately included within the session, sessionizer module 270 derives a session ID from a message and stores recognized data objects that need to be validated in association with the session ID. Sessionizer module 270 also determines whether the session ID exists. Referring again to rule 1, if the session ID exists and the recognized credit card number has not been stored in association with the session ID, it is added to the list of credit card numbers in session storage module 280 in association with the session ID. If the session ID does not exist, sessionizer module 270 creates a new session ID. Table 3 below shows exemplary records stored by session storage module 280 in association with a session ID.

TABLE 3

Exemplary Session Storage Module Records

| Session ID | Recognized Data Objects |
|---|---|
| 22 | 1234 5678 5678 0001 |
|  | 3333 2221 0001 2111 |
| 46 | 5678 5555 0001 2111 |
|  | 3333 2221 5678 0001 |

Rule engine 240 preferably maintains a running counter to determine a number of occurrences of different credit card numbers that are being transmitted by sever 120 during the same user session. Messages having a high number of occurrences of different credit card numbers during the same user session are more likely to be in response to a malicious attack rather than to a legitimate request. Accordingly, if more than three occurrences of different credit card numbers are being transmitted by server 120 during one session, rule engine 240 preferably modifies the message by masking 350 the majority of digits in the credit card numbers as to make them worthless to hackers. Rule engine 240 transmits the modified message to client 110.

Rule 2

Health Insurance Portability and Accountability Act of 1996 (HIPAA) requires protection of patient medical information transmitted electronically. The present disclosure ensures that web applications comply with HIPAA requirements by detecting each instance of unauthorized transmission of patient medical information, such as patient records, eligibility information, medical claims and payments, via web applications. For example, according to HIPAA, patient name, age, patient code, and social security number cannot be displayed together on one web page. To this end, a rule, such as rule 2, may require that if a patient name, age, patient code, and social security number are recognized and they appear on the same web page, patient code needs to be suppressed before the message can be transmitted to server 120.

To process rule 2, rule engine 240 recognizes data objects that are preceded by "patient code" field, "name" field, "age" field, and "SSN" field. Rule engine 240 determines whether the recognized data objects are displayed together on the same web page and performs an action in response to the determination. If all the recognized data objects are displayed on one web page, rule engine 240, for example, modifies the message by suppressing the patient code. Rule engine 240 transmits the modified message to client 110.

Rule 3

To login to the server 120, a user submits to the server 120 a user name and password over the network 150, typically in a HTML form. Security gateway 130 prevents unauthorized users from accessing web application data by validating passwords provided by users.

For example, security gateway 130 receives the following message posted by client 110:

Login?name=Jack & Password=159jack and web pageID=loginpage

Rule engine 240 determines whether the received message is a client message or a server message and indexes into rules database module 250 using this information to apply a rule (or rules), such as rule 3, for recognizing and validating client messages.

According to rule 3, if a recognized data object is a password and it matches a commonly-used password, the message including the recognized data object is not allowed. To process rule 3, rule engine 240 recognizes a data object preceded by a "password" field using well-known algorithms for recognizing data objects. Rule engine 240 also validates the recognized data object by determining whether it matches commonly-used passwords. Commonly-used passwords maintained by rule engine 240 include, for example, the following passwords: "root", "qwerty", "god" and popular women's names. If the recognized data object matches a commonly-used password, rule engine 240 performs 350 an action in response to the validation. Because a user password that matches commonly-used passwords is more likely to be entered by malicious attackers rather than by legitimate users, rule engine 240 blocks the message that includes a commonly-used password and alerts the system administrator about an attempted security breach.

Alternative Embodiment

Figure 4:
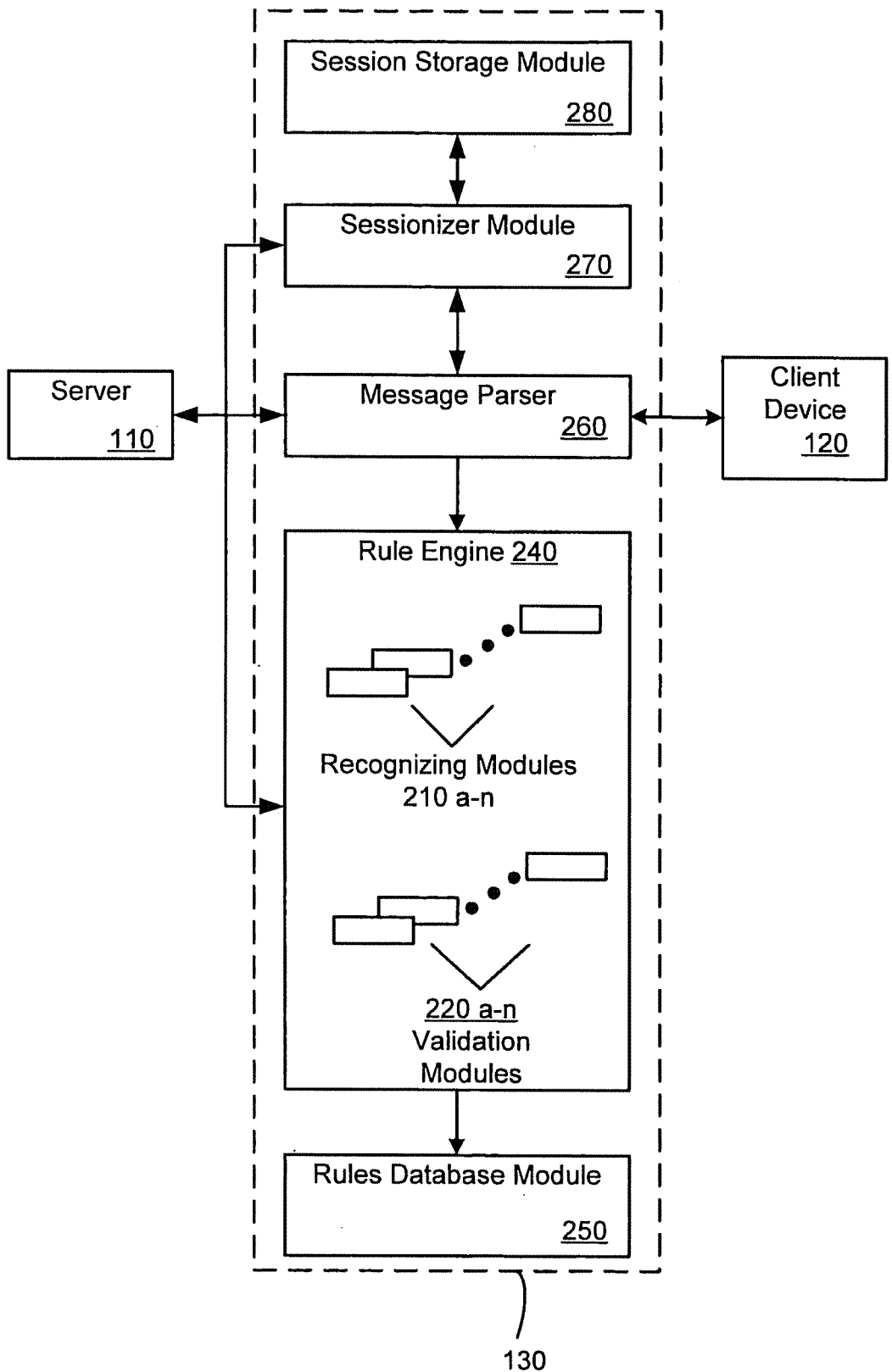
FIG. 4 is a block diagram of an alternative embodiment of a system for protecting unauthorized transmission of confidential personal identification information via web applications.

FIG. 4 is a block diagram of an alternative embodiment of a system for protecting unauthorized transmission of confidential personal identification information via web application. FIG. 4 shows all the components shown in FIG. 2. FIG. 4 additionally shows a plurality of recognizing modules 210a-n and a plurality of validation modules 220a-n. Recognizing modules 210a-n are plug-in modules that include functionality for recognizing data objects. Exemplary recognizing modules 210 an utilized by security gateway 130 are: Name Recognizer, Social Security Recognizer, Credit Card Recognizer, Age Recognizer, TrueMatch Recognizer, Patient Code Recognizer, US Passport Recognizer, and Regular Expression Recognizer. These modules are collectively referred to as modules 210a-n.

Validation modules 220a-n are plug-in modules that include functionality for determining whether recognized data objects are appropriately included within the context. Exemplary validation modules 220a-n utilized by security gateway 130 are: SAFE Commerce Validator, Password Validator, HIPAA Validator, Counter Validator (checks number of occurrences per message request or per session). These modules are collectively referred to as modules 220a-n. The functionality of recognizing modules 210a-n and validation modules 220a-n is described in more detail below in reference to FIG. 5.

Figure 5:
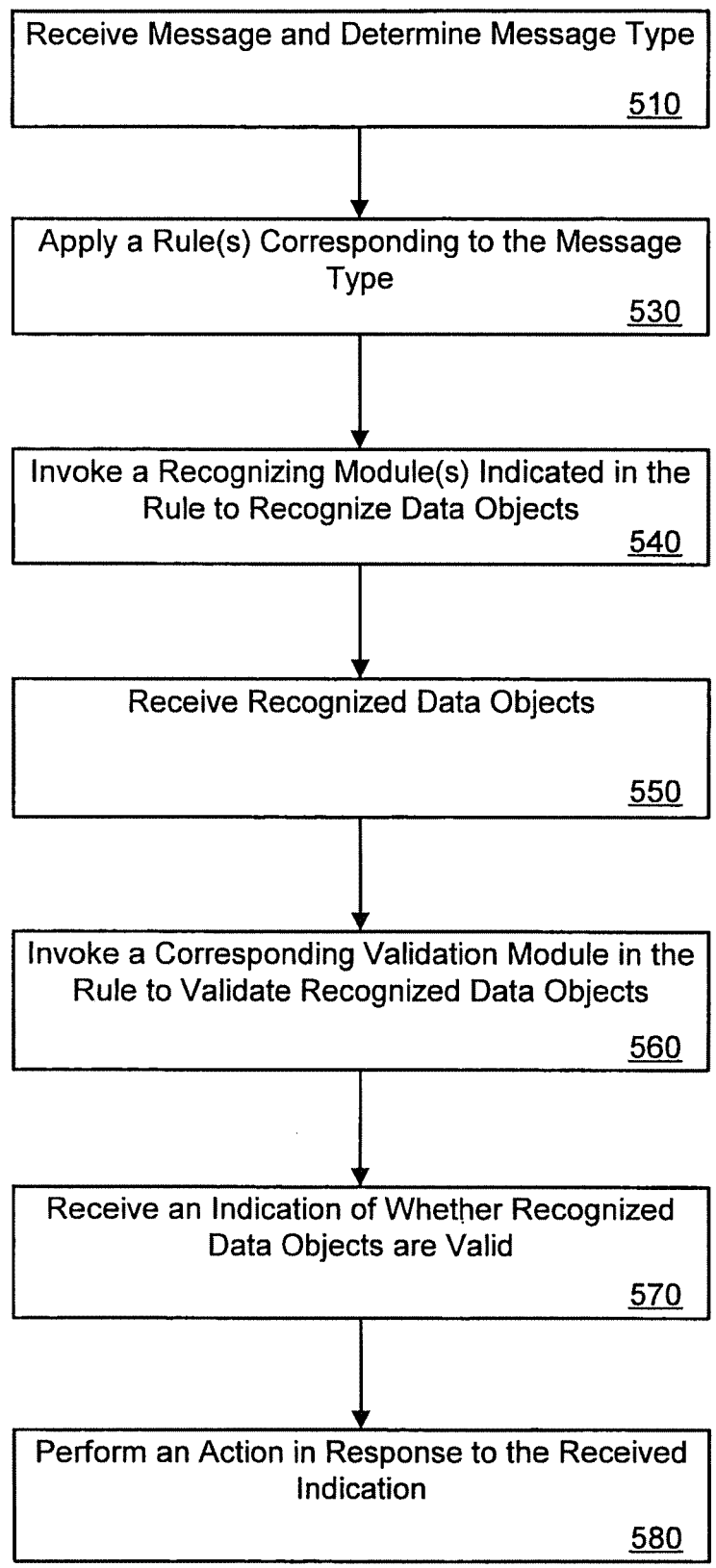
FIG. 5 is a flow chart of a method performed by the system of FIG. 4.

Referring now to FIG. 5, rule engine 240 receives a message or an object model, determines (step 510) a type of the message (HTML, XML, or any other type) and whether the message is a client message or a server message. Rule engine 240 indexes into rule database module 250 to apply (step 530) a corresponding rule (or rules) to recognize, validate, and perform an action on the recognize data objects. A rule in the rules database module 250 includes a predicate and consequent (see Table 4 below). A predicate includes a recognizing component and a validation component. A rule can have one or more recognizing components and a validation component. A recognizing component in the rule is implemented as one or more recognizing plug-in modules 210 for recognizing data objects. A validation component in the rule is implemented as a corresponding validation plug-in module 220 for validating data objects.

To process a rule, rule engine 240 invokes (step 540) a corresponding recognizing plug-in module 210 (or modules) indicated in the rule. A recognizing module 210 recognizes data objects and outputs recognized data objects to rule engine 240. Rule engine 240 receives (step 550) recognized data objects and forwards recognized data objects to corresponding validation module 220 indicated in the rule. The validation module 220 determines (step 560) whether the recognized data objects are appropriately included in the context and provides an indication (step 570) to rule engine 240 of whether recognized data objects are valid. Rule engine 240, in turn, performs an action (step 580) as indicated in the rule in response to the received indication. A rule may be constructed as follows: IF (Recognizing component recognizes) and (Validation Component Validates) THEN Perform Action.

Exemplary rules stored in rules database module 240 are shown below in Table 4:

| Rule ID | Message Type | Client/Server Message | Predicate 1 Recognizing Component | Predicate 2 Validation Component | Consequent |
|---|---|---|---|---|---|
| 1. | HTML | Server Message | Credit Card recognizer | SAFE Commerce Validator | Transform to *+4/ Log the message/Allow Message |
| 2. | HTML | Server Message | Patient Code Recognizer Name Recognizer Age Recognizer SSN Recognizer | HIPAA validator | Replace patient code with "suppress"/Allow Message/Disallow Message |
| 3. | HTML | Client Message | Password Recognizer | SAFE Password Validator | Allow/Disallow message |

At this point it is beneficial to explain some of the rules listed in Table 4.

Rule 1

To process rule 1, rule engine 240 invokes a credit card recognizer. The credit card recognizer includes required functionality for recognizing credit card data objects. The credit card recognizer, for example, searches a string of 16 characters having a numeric data type and outputs recognized credit card numbers to rule engine 240.

Rule engine 240 receives recognized credit card numbers and invokes a SAFE

Commerce validator to determine whether the recognized credit card numbers are appropriately included in the context. SAFE Commerce validator is adapted to determine whether recognized credit card numbers are appropriately included in the context. SAFE Commerce validator determines whether the number of occurrences of different credit cards within the message exceeds a predetermined number. SAFE Commerce validator performs this determination using, for example, the method described in more detail earlier in the "Methods of operation" section of the present disclosure. If the number of occurrences of different credit card numbers within the message exceeds a predetermined number, SAFE Commerce validator indicates to rule engine 240 that the credit card numbers have not been validated. It should be noted that the number or occurrences used by the SAFE Commerce validator to validate recognized credit card numbers is configurable. Rule engine 240 also performs an action in response to the determination provided by SAFE Commerce validator. Rule engine 240, for example, transforms credit card numbers by masking first 12 digits of the credit card numbers.

SAFE Commerce validator is also adapted to determine whether the number of occurrences of different credit card numbers within a session exceeds a predetermined number. To this end, SAFE Commerce validator preferably uses a method described in more detail earlier in the "Methods of operation" section of the present disclosure.

Rule 2

To process rule 2, rule engine 240 invokes a Name recognizer, SSN recognizer, Patient Code recognizer, and Age recognizer as indicated in rule 2. In one implementation, Name recognizer recognizes data objects preceded by "name" field; Patient Code recognizer recognizes data objects preceded by "patient code" field; SSN recognizer recognizers data objects preceded by "SSN" field; and Age recognizer recognizes data objects preceded by "age" field. Once these data objects have been recognized, rule engine 240 invokes a corresponding HIPAA validator as indicated in the rule. HIPAA validator is adapted to validate the recognized data objects. HIPAA validator, for example, determines whether all recognized data objects are displayed on the same web page. HIPAA validator outputs an indication of whether the recognized data objects are valid to rule engine 240. Rule engine 240, in turn, performs an action in response to the indication. If the recognized data objects are not valid, rule engine 240 suppresses the patient code in the message and transmits the modified message to client 110.

Rule 3

To process rule 3, rule engine 240 invokes a password recognizer to recognize a password value in the message. The password recognizer is adapted to recognize password data objects by searching for a value preceded by "password" field. The password recognizer outputs the recognized password value to rule engine 240. Rule engine 240, in turn, invokes a SAFE Password validator. SAFE Password validator is adapted to validate the password value by preferably determining whether the password matches commonly-used passwords. SAFE Password validator provides an indication to rule engine 240 of whether the recognized password value is valid (validation of a password data object was described in more detail in the "Methods of Operation" section of the present disclosure). Rule engine 240, in turn, performs an action in response to the indication. If the password value is not valid, rule engine 240, for example, blocks the message and alerts a system administrator.

Thus, the present disclosure advantageously reduces the risk of identity theft and financial fraud through web applications. The present disclosure monitors personal identification information that is being sent out between server 120 and client 110 and blocks, transforms, or selectively allows personal identification information. The present disclosure also alerts system administrators of the attempted security breach and logs details of the thwarted attack.

The present disclosure has been described in particular detail with respect to two possible embodiments. Those of skill in the art will appreciate that the disclosure may be practiced in other embodiments. The particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and are operated with different hardware platforms in conjunction with real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention, which is set forth in the following claims.

What is claimed is:

1. A method for transforming, by a security gateway, a message transmitted from a client to a server via the security gateway, the method comprising:
   receiving, by a security gateway executing on a device, a message from a client transmitted to a server via a session, the message comprising a first data object;
   identifying, by a rule engine of the security gateway, a type of the message corresponding to a type of language used in the message and
   identifying, a rule corresponding to the type of the message and that the message is a client message;
   recognizing, by the rule engine, that the first data object matches a pattern according to the rule;
   determining, by the rule engine, that the recognized first data object is not valid for the session according to the rule;
   modifying, by the security gateway according to the rule and in response to the determination, the message by one of disallowing, suppressing or transforming the first data object; and
   transmitting, by the security gateway, the modified message to the server.

2. The method of claim 1, further comprising parsing, by a message parser, the message into the first data object prior to recognition by the rule engine.

3. The method of claim 1, further comprising:
   receiving, by the security gateway, a second message from the client transmitted to the server via the session, the second message and comprising a second data object;
   identifying, by the rule engine, a second type of the second message and a second rule corresponding to the second type of the second message;
   recognizing, by the rule engine, that the second data object matches a pattern according to the second rule;
   determining, by the rule engine, that the recognized second data object is valid for the session according to the second rule; and
   transmitting, by the security gateway, the second message to the server.

4. The method of claim 3, wherein the first data object comprises one of the following: a name-value pair, a string of characters or a string of numbers.

5. The method of claim 1 wherein the first data object comprises one of the following: a name of a person, a first number identifying the person from a plurality of persons, a second number identifying confidential information relating to the person.

6. The method of claim 1, wherein the first data object comprises one or more of the following: a person's name, a social security number, a credit card number, a driver's license number or a patient code.

7. The method of claim 1, wherein the security gateway is an intermediary between the client and the server, intercepting and forwarding messages between the client and the server.

8. The method of claim 1, further comprising storing, by a session storage module, data objects recognized within the session.

9. The method of claim 1, further comprising associating, by a session storage module, session related information with a session identifier corresponding to the rule of the rule engine.

10. The method of claim 1, further comprising: deriving, by a sessionizer module, a session identifier from the message to uniquely identify the session within which the message originated.

11. The method of claim 1, further comprising
   receiving, by the security gateway, a second message from the server transmitted to the client via the session, the second message comprising a plurality of data objects;
   identifying, by the security gateway, a second type of the second message;
   determining, by the rule engine, that a number of occurrences of credit card numbers within one or more data objects of the plurality of data objects exceeds a predetermined number;
   modifying, by the security gateway in response to the determination, one or more digits of a plurality of digits of a credit card number of the number of occurrences of credit card numbers; and
   transmitting, by the security gateway, the modified second message.

12. The method of claim 11, further comprising:
   determining, by the rule engine, that a third data object of the third message comprises one of: a name of a patient or a social security number of a patient; and
   modifying, by the security gateway in response to the determination, the third message by suppressing a portion of the third message.

13. A security gateway for transforming a message transmitted from a client to a server, the security gateway comprising:
   a message parser, executing on a device, receiving a message from a client transmitted to a server via a session, the message comprising a first data object;
   a rule engine identifying a type of the message corresponding to a type of language used in the message and a rule corresponding to the type of the message and that the message is a client message;
   a recognizing module, recognizing that the first data object matches a pattern according to the rule;
   a validation module, determining that the recognized first data object is not valid for the session according to the rule;
   wherein the rule engine modifies, according to the rule and in response to the determination, the message by one of disallowing, suppressing or transforming the first data object, and the security gateway transmits the modified message to the server.

14. The security gateway of claim 13, further comprising one or more of the following: a name recognizing module, an age recognizing module, a social security number recognizing module, a passport recognizing module and a regular expression recognizing module.

15. The security gateway of claim 13, further comprising one or more of the following: a safe commerce validation module, a HIPAA validation module, or a safe password validation module.

16. The security gateway of claim 13, wherein the message parser parses the message into one or more data objects prior to recognition by the recognizing module.

17. The security gateway of claim 13, wherein the first data object comprises one or more of the following: a name-value pair, a string of characters or a string of numbers.

18. The security gateway of claim 13, wherein the first data object comprises one of the following: a name of a person, a first number identifying the person from a plurality of persons, a second number identifying confidential information relating to the person.

19. The security gateway of claim 17, wherein the first data object comprises one or more of the following: a person's name, a social security number, a credit card number, a driver's license number or a patient code.

20. The security gateway of claim 13, wherein the security gateway is an intermediary between a client and a server, intercepting and forwarding messages between the client and the server.

21. The security gateway of claim 13, further comprising a sessionizer module deriving a session identifier from the message uniquely identifying the session within which the message originated.

22. The security gateway of claim 21, further comprising a session storage module associating session related information with a session identifier corresponding to the rule of the rule engine.

23. The security gateway of claim 13, wherein:
the message parser receives a second message from the server transmitted to the client via the session, the second message comprising a plurality of data objects;
the rule engine identifies a second type of the second message;
the recognizing module determines that a number of occurrences of credit card numbers within one or more of data objects of the plurality of data objects exceeds a predetermined number;
the rule engine, in response to the determination, modifies one or more digits of a first credit card number of the number of occurrences of credit card numbers; and
the security gateway transmits the modified second message.

24. The security gateway of claim 13, wherein the rule engine determines that a third data object of the third message comprises one of a name of a patient or a social security number of a patient and in response to the determination modifies the third message by performing suppression of a portion of the third message.

25. A method for modifying a message transmitted between a client and a server via an intermediary device, the method comprising:
receiving, by a device intermediary to a client and a server, a message between the client and the server via a session, the message comprising a first data object;
determining, by a rule engine of the device, a message type corresponding to a type of language used in the message;
identifying, a rule corresponding to the message type and whether the message is a client message or a server message, the rule comprising a recognizing component and a validation component;
recognizing, by the rule engine using the recognizing component, that the first data object matches a pattern specified by the recognizing component of the rule;
determining, by the rule engine using the validation component of the rule, that the recognized first data object is not valid for the session specified by the validation component of the rule; and
modifying, by the device according to the rule and in response to the determination, the message by one of disallowing, suppressing or transforming the first data object.

* * * * *